US005486285A

United States Patent [19]

Feeney

[11] Patent Number: 5,486,285
[45] Date of Patent: Jan. 23, 1996

[54] AIR INLET VALVE FOR WATER COOLER

[75] Inventor: Brian Feeney, Toronto, Canada

[73] Assignee: The Clorox Company, Oakland, Calif.

[21] Appl. No.: 258,459

[22] Filed: Jun. 10, 1994

[30] Foreign Application Priority Data

Jun. 10, 1993 [CA] Canada ................................. 2098127

[51] Int. Cl.$^6$ ....................... B01D 35/143; B01D 35/027
[52] U.S. Cl. .............. 210/85; 62/389; 137/453; 210/136; 210/469; 222/36; 222/185.1; 222/189.06
[58] Field of Search ............................... 210/85, 87, 136, 210/464, 466, 467, 469, 474, 475, 476, 477; 222/189, 185, 146.6, 36, 146.11; 137/453, 533.11, 533.13; 62/389, 397; 55/420

[56] References Cited

U.S. PATENT DOCUMENTS

| 1,228,836 | 6/1917 | Schulse | 222/185 |
|---|---|---|---|
| 1,228,837 | 6/1917 | Schulse | 210/476 |
| 1,368,703 | 2/1921 | Czerny | 222/185 |
| 1,658,227 | 2/1928 | Davis, Jr. . | |
| 1,918,767 | 7/1933 | Maine . | |
| 1,963,570 | 6/1934 | Warren | 62/397 |
| 2,389,185 | 11/1945 | Dick | 210/62 |
| 2,525,709 | 10/1950 | Morrison | 62/391 |
| 2,725,725 | 12/1955 | Materese et al. | 62/397 |
| 2,767,960 | 10/1956 | East | 62/397 |
| 3,088,289 | 5/1963 | Alex | 62/397 |
| 3,367,133 | 2/1968 | Dreis et al. | 62/390 |
| 3,923,662 | 12/1975 | O'Brien | 210/251 |
| 4,145,291 | 3/1979 | Console et al. | 210/232 |
| 4,181,243 | 1/1980 | Frahm | 222/189 |
| 4,629,096 | 12/1986 | Schroer et al. | 222/146 |
| 4,764,274 | 8/1988 | Miller | 210/232 |
| 4,834,267 | 5/1989 | Schroer et al. | 222/185 |
| 4,881,661 | 11/1989 | Jones | 222/67 |
| 4,938,389 | 7/1990 | Rossi et al. | 222/189 |
| 4,990,254 | 2/1991 | Toida et al. | 210/464 |
| 4,993,229 | 2/1991 | Baus et al. | 62/3.64 |
| 5,139,666 | 8/1992 | Charbonneau et al. | 210/264 |

FOREIGN PATENT DOCUMENTS 2041897  9/1980  United Kingdom ................... 222/185

OTHER PUBLICATIONS

PCT/US87/02910, international filing date Nov. 6, 1987, entitled Container and Liquid Dispenser.

Primary Examiner—Joseph W. Drodge
Attorney, Agent, or Firm—Sim & McBurney

[57] ABSTRACT

For use in a water cooler having a reservoir adapted to receive the neck portion of an inverted water tank, a filter system comprising an attachment removably connected to the neck and forming a water-tight seal therewith, a sleeve projecting from the attachment for receiving a replaceable water filter adapted to pass water from the tank into the reservoir, and a one-way valve projecting from the attachment for admitting air into the tank responsive to water flowing out of the tank via the water filter, the one-way valve including a movable bead adapted to prevent water from flowing therethrough while permitting air to pass therethrough.

6 Claims, 4 Drawing Sheets

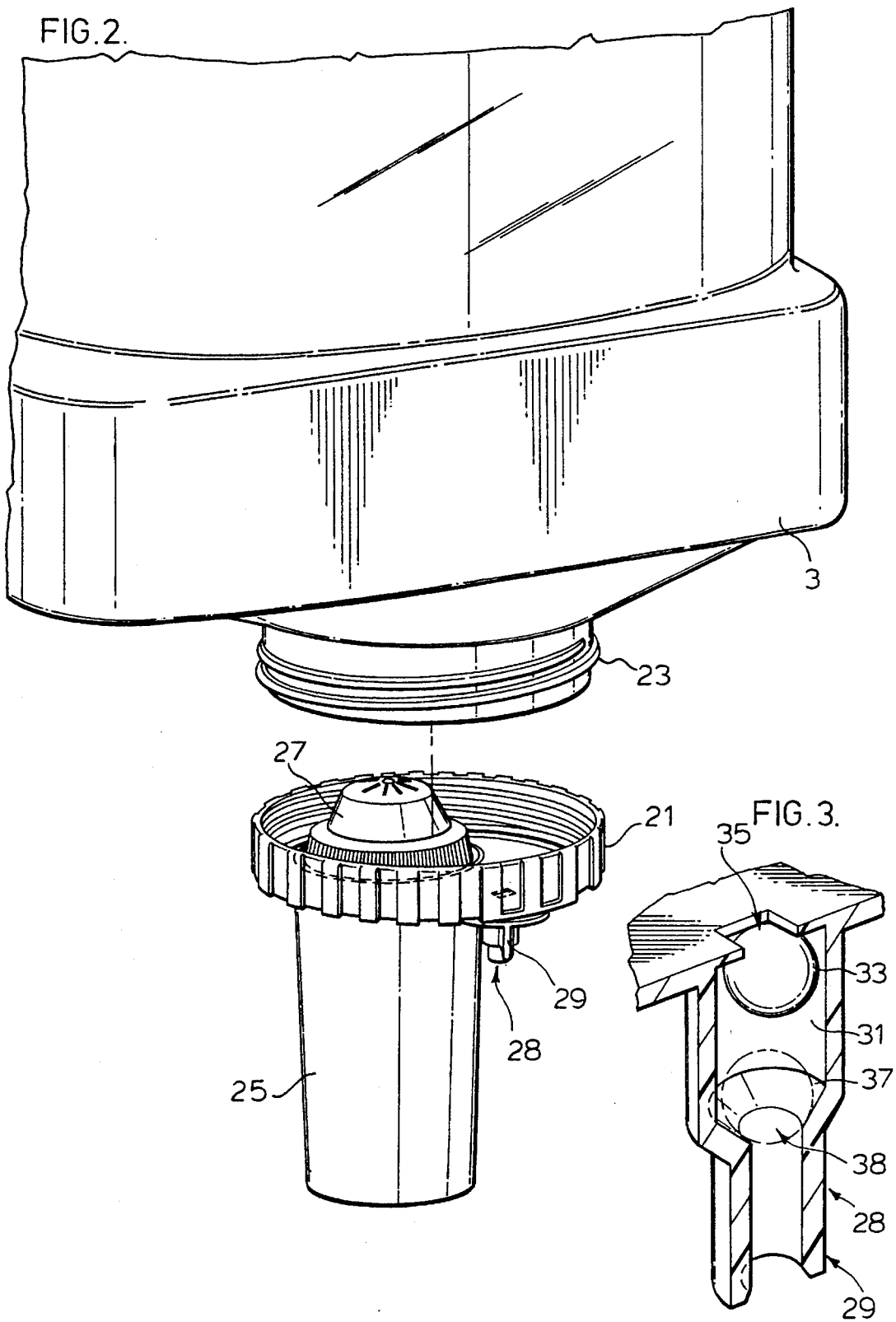

FIG. 4.B.
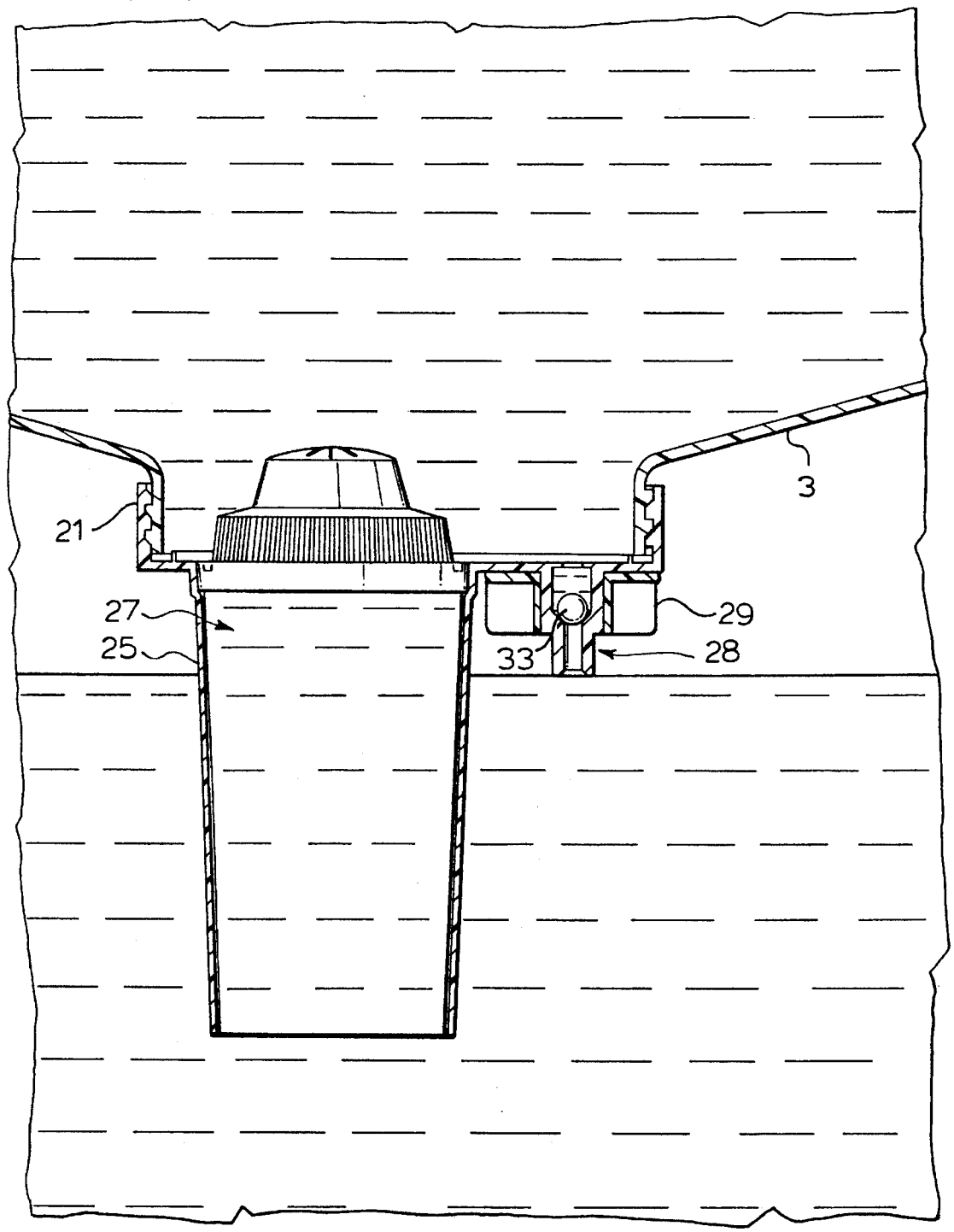

AIR INLET VALVE FOR WATER COOLER

FIELD OF THE INVENTION

This invention relates in general to bottled water delivery systems or water coolers, and more particularly to an air inlet valve for a water cooler filtering system.

BACKGROUND OF THE INVENTION

Water coolers are well known for providing fresh, cold bottled water in office, domestic or other environments. Some prior art bottled water delivery systems are also capable of heating and even boiling water for the purpose of making coffee, tea, etc. Prior art water coolers typically comprise a housing which contains a water reservoir at the top, a water delivery faucet connected to the reservoir and having a trigger-operated spigot or spout for user-controlled pouring of water from the reservoir into a cup, pot, etc. A water tank or bottle is mounted on top of the housing in an inverted position so that the neck portion of the tank or bottle extends downwardly into the reservoir. In operation, water flows through the neck into the reservoir while air flows into the tank or bottle through the neck in order to equalize pressure inside and outside of the tank. When the water level in the reservoir rises to cover the mouth of the neck, air can no longer enter the tank through the neck and water ceases flowing from the tank into the reservoir. In response to user activation of the faucet, the water level in the reservoir drops thereby opening the mouth of the tank which permits water to flow out of the tank and air to flow into the tank for replenishing the water level in the reservoir until the water level again rises to the mouth of the neck.

One disadvantage of such prior art water coolers is that it is not possible to attach a water filter to the neck of the tank or bottle for filtering the water as it is dispensed, since air is not capable of passing through conventional filter material.

In an effort to overcome this disadvantage of the prior art water coolers, one system is known in which a water filter attachment is provided to the neck of a water bottle or tank in combination with a one-way air valve for admitting air into the tank. According to this system, the one-way air valve is in the form of a hollow tube which tapers at the top to a diameter which is small enough that surface tension prevents water from flowing therethrough, but is large enough to permit air to flow into the tank.

The above-identified prior art system suffers from a number of disadvantages. The one-way valve is time consuming to install and therefore labour intensive, and is of awkward shape which makes packaging difficult. The valve is of delicate design which lacks robustness and is potentially unreliable.

SUMMARY OF THE INVENTION

According to the present invention, a water cooler filter system is provided with an improved one-way air valve which utilizes a movable bead within a chamber adapted to prevent water from flowing out of the tank while permitting air to pass into the tank. As air enters the one-way valve, the bead rises in a chamber so as to partially cover an aperture disposed at the top of the chamber. Partial covering of this aperture allows air to pass through the valve in to the tank but prevents the bead from enterring into the tank through from the valve. Under the influence of gravity, the bead settles into a lower bevelled portion of the chamber once pressure in the tank is equalized with atmospheric pressure. A lower aperture surrounded by a bevelled portion of the chamber is completely closed when the bead settles into the bevelled portion, thereby preventing water from flowing out of the tank through the valve.

BRIEF DESCRIPTION OF THE DRAWINGS

A detailed description of the preferred embodiment is provided herein below with reference to the following drawings, in which:

FIG. 2 illustrates the filter system of the present invention and the mode of its connection to the neck of a conventional water tank or bottle;

FIG. 3 is a cross-sectional detail of the one-way air inlet valve according to the preferred embodiment; and FIGS. 4a and 4b show operation of the filter system according to the present invention with the valve open (FIG. 4a) and closed (FIG. 4b).

DETAILED DESCRIPTION OF THE PREFERRED EMBODIMENT

Figure 1:
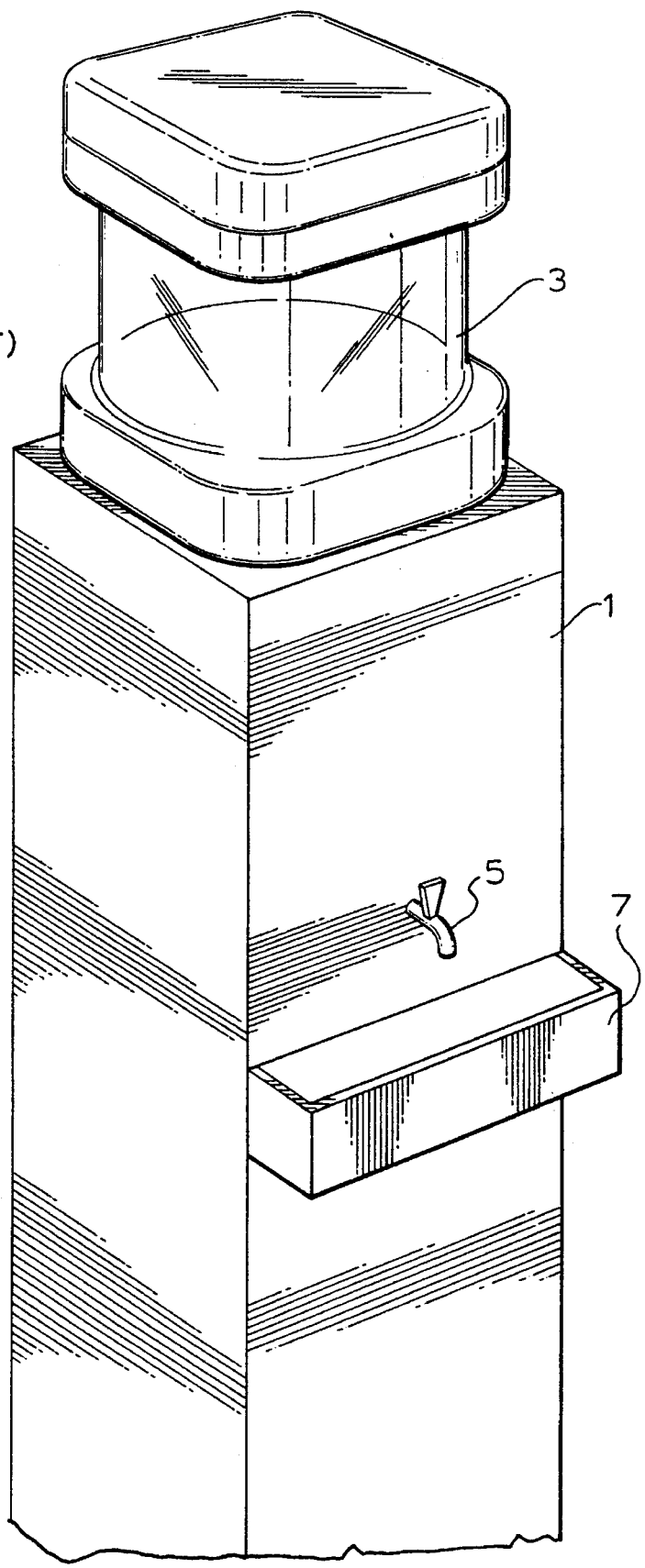
FIG. 1 is a perspective view of a conventional water cooler in conjunction with which the filter system of the present invention may be used.

In FIG. 1, a conventional water cooler is shown comprising a housing i containing a reservoir (FIGS. 4a and 4b) into which the neck portion (FIGS. 4a and 4b) of a water tank or bottle 3 may be inserted. Thus, the water bottle 3 is mounted on the water cooler of FIG. 1 in an inverted orientation. A spigot 5 is provided for user-controlled dispensing of water from the cooler. A catch basin 7 is also typically provided for catching any water spillage.

Figure 4A:
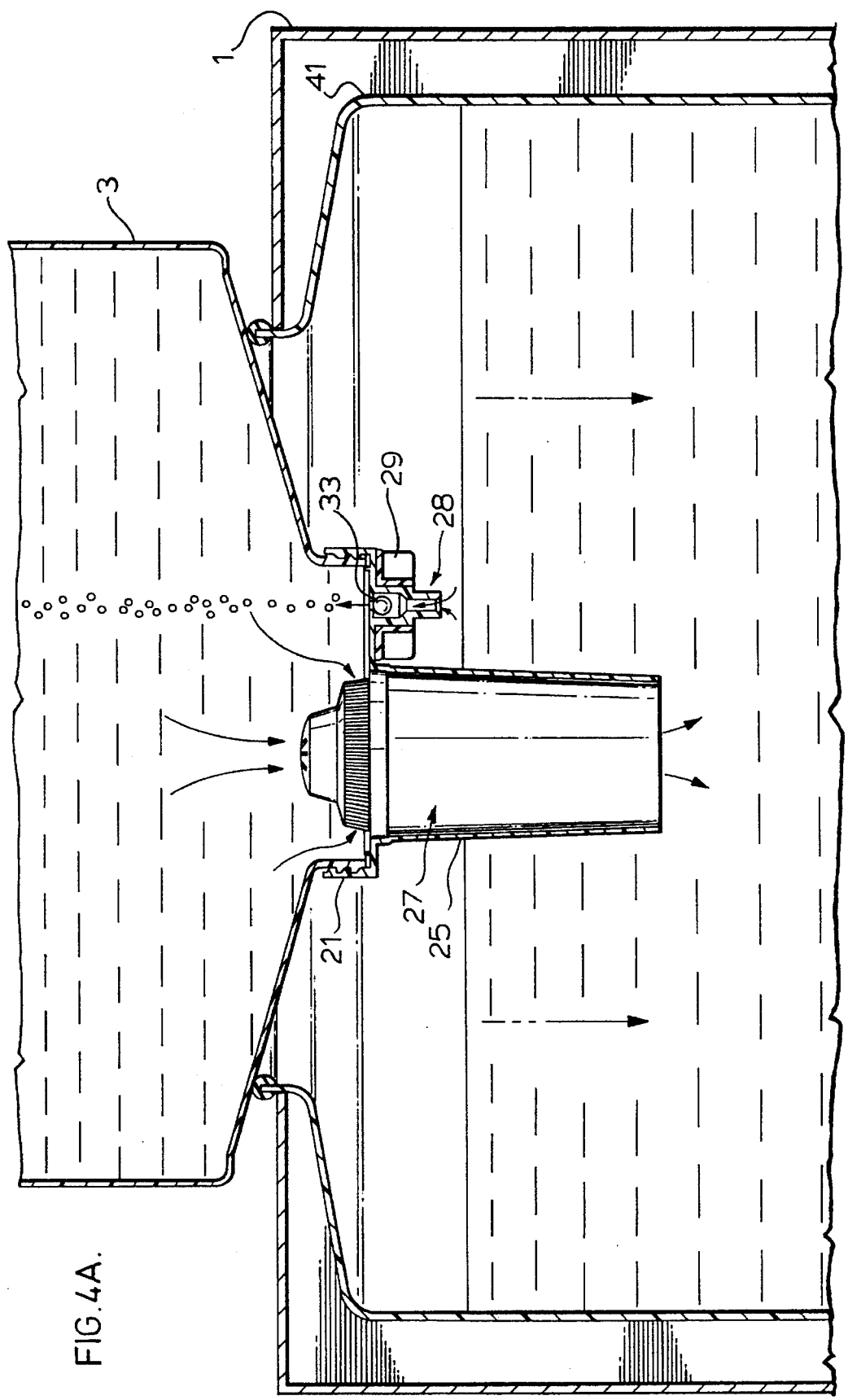

Turning to FIG. 2, the filter system of the present invention is shown comprising a threaded attachment portion 21 for connection to a threaded neck 23 of the tank or bottle 3. The filter system is provided with a sleeve portion 25 for receiving a replaceable water filter 27 adapted to pass water from the tank 3 into a reservoir (FIGS. 4a and 4b). The water filter 27 may be any well known filter design. According to the preferred embodiment, there is also provided a one-way valve 28 for admitting air into the tank 3 responsive to water flowing out of the tank via the water filter 27. According to the preferred embodiment, a rotatable indicator 29 is also preferably mounted to the one-way valve 28 so as to be rotatable about the central axis of the valve 28. The rotatable indicator 29 may be used for monitoring replacement intervals of the water filter 27.

Turning to FIG. 3, details of the construction of the valve 28 are shown. Specifically, the valve 28 comprises a chamber 31 for housing a movable bead, such as a spherical ball 33. A generally rectangular aperture 35 is provided at an upper portion of chamber 31, and the chamber has a bevelled portion 37 at a lower end which opens into a lower aperture 38 of the chamber 31. This lower aperture 38 extends via a stem portion 29 so as to open into the reservoir (FIGS. 4a and 4b), whereas the upper aperture 35 opens into the neck of the bottle or tank 3.

Turning now to FIGS. 4a and 4b, details of operation of the filter system according to the present invention are provided. As shown in FIG. 4a, when water is dispensed from the reservoir 41, the water level therein begins to drop and water begins flowing out of the tank 3 via water filter 27, under the influence of gravity. As water flows out of the tank 3, a pressure differential develops between the inside and outside of tank 3. This pressure differential creates an upward force on the ball 33 causing it to rise to the top of chamber 31. The bead 33 provides an obstruction to downward flow of water through lower aperture 38 in the event of small pressure differences between inside and outside of the tank 3.

As the water level in reservoir 41 begins rising, the pressure inside and outside of tank 3 equalizes and the ball 33 settles into the bevelled portion 37 so as to completely obstruct aperture 38, as shown with phantom lines in FIG. 3, and as shown more generally in FIG. 4b.

In this position, water is prevented from flowing into the reservoir 41 via aperture 38 as a result of the flush connection between ball 33 and bevelled portion 37. When the ball 33 is seated in bevelled portion 37, a downward force is exerted on the ball 33 equivalent to the mass of the ball in combination with the head of water bearing down on it from tank 3 and the internal air pressure at the top of the tank 3.

In summary, according to the present invention, an improved filter system is provided for use with a water cooler, utilizing a one-way valve for admitting air into a water tank responsive to water flowing out of the tank via a water filter, and wherein the one-way valve includes a movable bead adapted to prevent water from flowing through the valve while permitting air to pass through it.

Modifications and variations of the invention are possible. For example, instead of using a spherical ball as a bead, other types of beads having different shapes may be utilized. Consequently, the shapes of the upper and lower apertures on opposite sides of the chamber may be of any convenient configuration or dimension adapted to cooperate with the shape of the bead.

All such embodiments and variations are believed to be within the sphere and scope of the present invention as defined by the claims appended hereto.

I claim:

1. For use in a water cooler having a reservoir adapted to receive a neck portion of an inverted water tank, a filter system comprising attachment means for removable connection to said neck portion and forming a water-tight seal therewith, sleeve means projecting from said attachment means for receiving a replaceable water filter adapted to pass water from said neck portion of said tank into said reservoir, and a one-way valve projecting from said attachment means for admitting air into said neck portion of said tank responsive to water flowing out of said neck portion of said tank via said water filter, wherein said one-way valve further comprises a chamber for housing said movable bead means, an upper aperture and a lower aperture disposed at opposite ends of said chamber, said upper aperture and said lower aperture being dimensioned to cooperate in shape with said moveable bead means such that said movable bead means rises in said chamber so as to partially cover said upper aperture for preventing water from entering said chamber while admitting air from said chamber into said neck portion of said tank in response to a pressure differential between inside of said tank and outside of said tank caused by said water flowing out of said neck portion of said tank, such that said movable bead means drops in said chamber so as to completely cover said lower aperture for preventing water from entering said reservoir via said chamber in response to equalized pressure inside of said tank and outside of said tank.

2. The filter system of claim 1, wherein said movable bead means is a spherical ball.

3. The filter system of claim 2, wherein said upper aperture is generally rectangular such that said upper aperture remains only partially covered when said spherical ball is positioned there against.

4. The filter system of claim 2, wherein said lower aperture is bevelled to receive said spherical ball flush there against.

5. For use in a water cooler having a reservoir adapted to receive a neck portion of an inverted water tank, a filter system comprising attachment means for removable connection to said neck portion and forming a water-tight seal therewith, sleeve means projecting from said attachment means for receiving a replaceable water filter adapted to pass water from said neck portion of said tank into said reservoir, and a one-way valve projecting from said attachment means for admitting air into said neck portion of said tank responsive to water flowing out of said neck portion of said tank via said water filter, said one-way valve including movable bead means adapted to prevent water from flowing therethrough while permitting air to pass therethrough, further comprising a rotatable indicator mounted to said one-way valve for monitoring replacement intervals of said replaceable water filter.

6. A water cooler, comprising:

a) a reservoir adapted to receive a neck portion of an inverted water tank;

b) an attachment portion removably connected to said neck portion and forming a water-tight seal therewith;

c) a sleeve projecting from said attachment portion for receiving a replaceable water filter adapted to pass water from said neck portion of said tank into said reservoir; and d) a one-way valve projecting from said attachment means for admitting air into said neck portion of said tank responsive to water flowing out of said neck portion of said tank via said water filter, said one-way valve having an upper aperture opening into said tank and a lower aperture opening into said reservoir and said one-way valve including a moveable bead constructed and arranged to partially cover said upper aperture and thereby prevent water from flowing therethrough while permitting air to pass therethrough in response to a pressure responsive movement of said bead.

* * * * *